Aug. 17, 1965

3,201,709

TUNABLE OPTICAL RESONATOR FOR HARMONIC GENERATION
AND PARAMETRIC AMPLIFICATION

Filed Dec. 19, 1963

SUBSTITUTE FOR MISSING XR

INVENTOR
G. D. BOYD
BY
*Sylvan Sherman*
ATTORNEY

United States Patent Office 3,201,709
Patented Aug. 17, 1965

3,201,709
TUNABLE OPTICAL RESONATOR FOR HARMONIC GENERATION AND PARAMETRIC AMPLIFICATION
Gary D. Boyd, Murray Hill, N.J., assignor to Bell Telephone Laboratories, Incorporated, New York, N.Y., a corporation of New York
Filed Dec. 19, 1963, Ser. No. 331,864
11 Claims. (Cl. 330—4.5)

This invention relates to resonators that are particularly adapted for use in parametric generators and amplifiers and in harmonic generators of electromagnetic waves at optical frequencies.

This application is a continuation-in-part of my copending application Serial No. 224,295, filed September 18, 1962 and now abandoned.

In the copending United States patent application by J. A. Giordmaine and D. A. Kleinman, Serial No. 158,267, filed December 11, 1961 and assigned to applicant's assignee, there is disclosed the use of nonlinear, birefringent crystals for the harmonic generation of coherent light. By the proper choice of the direction of propagation of the applied light through the crystal, one can satisfy the well-known Tien $\omega$-$\beta$ conditions and the harmonic light made to add cumulatively in appropriate phase, over an extended path length. The resulting output is the harmonic of the input wave. It is a limitation of the structure disclosed by Giordmaine and Kleinman, however, that only harmonics of a fixed input frequency can be produced, there being no means for tuning the device over a range of input frequencies.

In the copending United States application by A. Ashkin, Serial No. 224,294, filed September 18, 1962, and assigned to applicant's assignee, there is disclosed an arrangement whereby traveling wave parametric amplification and oscillations are possible over a wide range of frequencies in a single structure. The Ashkin invention is based upon the discovery that a nonlinear optical medium which exhibits adequate birefringence can be made to satisfy the Tien $\omega$-$\beta$ conditions and when the medium is used as a parametric amplifier or oscillator, can be made tunable over a wide range of frequencies.

Despite the obvious advantages of the Ashkin device, optimum operation requires that a plurality of pairs of planar, parallel mirrors be adjusted both as to angle and spacing. Since such adjustments are difficult to make and to maintain, there are practical problems inherent in the Ashkin devices which limit their application.

The present invention overcomes the above-mentioned shortcomings in the prior art devices by using a spherically shaped nonlinear, birefringent material. This spherically shaped element, which is rotatable about its center, is located between a pair of partially transparent mirrors. The mirror centers and the center of the sphere are aligned along a common axis and the incident light projected upon the sphere along this common axis.

The resonator is tuned by varying the distance between the mirrors. Because of its symmetry, the optical axis of the material can be oriented at any angle to the direction of propagation of the incident wave without seriously affecting the tuning, thereby satisfying the Tien $\omega$-$\beta$ condition without the need for any further extensive adjustment of the mirrors as was necessary heretofore. It is thus an advantage of the present invention that the cavity tuning adjustment and the optimum $\omega$-$\beta$ adjustment of the birefringent material are to a large degree independent adjustments.

To minimize the criticalness associated with adjusting and maintaining the proper spacing between mirrors the mirror spacing can be periodically varied by vibrating one of the mirrors. The vibration of one of the mirrors causes it to be swept through the proper tuning position at regular intervals.

This expedient can be used in those applications in which a pulsed output is useful since the effect produced by vibrating one of the mirrors is to pulse modulate the output signal. If a continuous wave output is required, on the other hand, the resonator should be made mechanically stable to within a wavelength in accordance with current practices.

In the first embodiment of the invention, a pair of curved mirrors are used. In a second illustrative embodiment of the invention, a pair of planar mirrors are used. While planar mirrors would appear to present more difficulties of adjustment than curved mirrors, it can be shown that due to the presence of the spherical element, the planar mirrors, as viewed from within the sphere, behave as curved mirrors and, as such, their adjustment is substantially less critical than would be expected.

The region of stable, low-loss operation of the resonator is defined for both embodiments, the planar mirrors being considered as curved mirrors of infinite radius.

These and other objects and advantages, the nature of the present invention, and its various features, will appear more fully upon consideration of the various illustrative embodiments now to be described in detail in connection with the accompanying drawings, in which.

Figure 1:
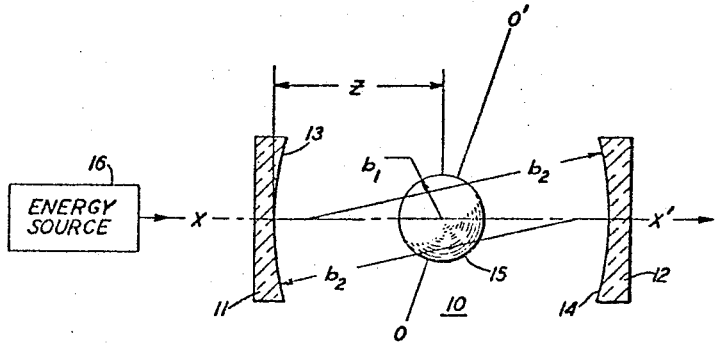
FIG. 1 is a first embodiment of the invention using curved mirrors.

Referring now to FIG. 1, there is shown a diagrammatic view of a first embodiment of a resonator 10, in accordance with the invention, using physically curved mirrors 11 and 12. The mirrors have curved reflecting surfaces 13 and 14, respectively, which are partially light transmissive. Both mirrors have a radius of curvature $b_2$ and centers which lie along a line $x$–$x'$ which defines the resonator axis.

Located centrally within resonator 10 is a sphere 15 of nonlinear, birefringent material such as, for example, KDP($KH_2PO_4$) having an optical axis designed O–O'. The material, more generally, can be either uniaxial or biaxial, in which case axis O–O' is one of the optical axes. Similarly, the material can be either negative birefringent or positive birefringent. The precise properties of the material used would depend upon the application at hand. For purposes of parametric devices and harmonic generators, the only essential properties are nonlinearity and birefringence.

Coherent energy from an energy source 16, such as an optical maser, is directed upon sphere 15 through mirror 11. Preferably, the center of sphere 15 is located along the resonator axis and the direction of propagation of the incident wave energy derived from source 16 is coincident with the resonator axis.

Means are provided for rotating sphere 15 within resonator 10 in order to adjust the angle between the optic axis and the direction of wave propagation. Such variations in angle are effected in order to satisfy the Tien $\omega$-$\beta$ conditions whenever the resonator is tuned to a different frequency.

To avoid unduly cluttering the figure, however, the mechanism for rotating sphere 15 is not shown. Typically, a clamping mechanism is used and means are provided for rotating the sphere about the axis of the clamp and, about the center of the sphere.

The resonator itself is tuned by an axial translational movement of one or both mirrors 11 and 12, which movement varies the distance between the mirrors. As is pointed out in the above-mentioned Ashkin application, the resonator can be tuned to multiple resonance for parametric applications.

The embodiment of FIG. 1, shown with a single energy source 16, can be used as a parametric oscillator which, upon the application of sufficient pumping energy at a given frequency, produces a signal wave and an idler wave whose frequencies and phase constants depend upon the orientation of the optic axis of the sphere 15. Alternatively, the embodiment of FIG. 1 can be used as a harmonic generator in which signal energy at a given frequency induces harmonic frequency components in sphere 15.

Figure 2:
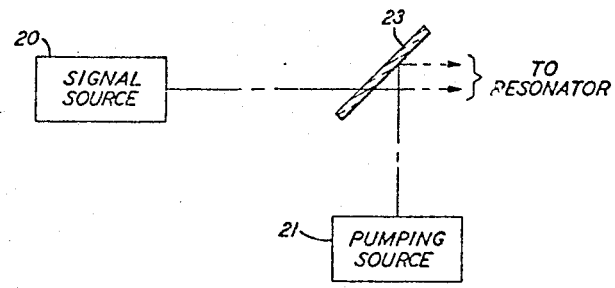
FIG. 2 illustrates a method of applying two parallel signals to the resonator illustrated in FIG. 1.

For parametric amplification, energy from a coherent signal source 20 can be applied to resonator 10 substantially parallel to the energy from a coherent pumping source 21, in the manner shown in FIG. 2, by means of a semitransparent mirror 23 oriented at 45 degrees to the two sources.

It is known that confocal and nonconfocal curved mirror resonators have regions of stability and instability. That is, the resonator exhibits low losses only for certain prescribed ratios of mirror spacing to mirror curvature. For a thorough discussion of confocal resonators, see the article by G. D. Boyd and H. Kogelnik entitled "Generalized Confocal Resonator Theory" published in the July 1962 issue of the Bell System Technical Journal, pages 1347 to 1370. In the instant case, the added focusing effect of sphere 15 is also taken into consideration.

From elementary optics, a sphere is known to be a thick lens whose principal planes are located at the center of the sphere. As a result the sphere behaves as a thin lens having a focal length $f_1$ given by $$f_1 = \frac{nb_1}{2(n-1)} \quad (1)$$

where $n$ is the index of refraction of the sphere in the chosen direction for the matching of phase velocities, and
$b_1$ is the radius of the sphere.

The reflecting mirrors have focal length $f_2$ given by $$f_2 = \frac{b_2}{2} \quad (2)$$

where $b_2$ is their radius of curvature.

To find the allowed regions of stability, a periodic sequence of lenses, illustrated in FIG. 2, is considered. This sequency of lenses, which is equivalent to the resonator of FIG. 1, is analyzed in the manner described by Boyd and Kogelnik.

Figure 3:
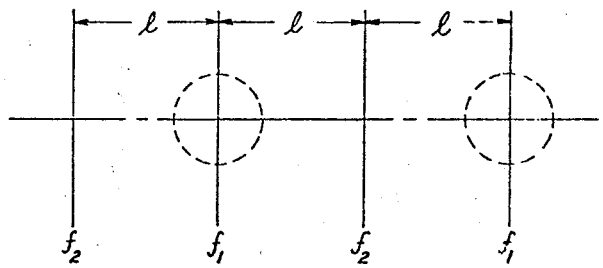
FIG. 3 shows a periodic sequence of lenses that is the equivalent of the embodiment of FIG. 1.
Figure 4:
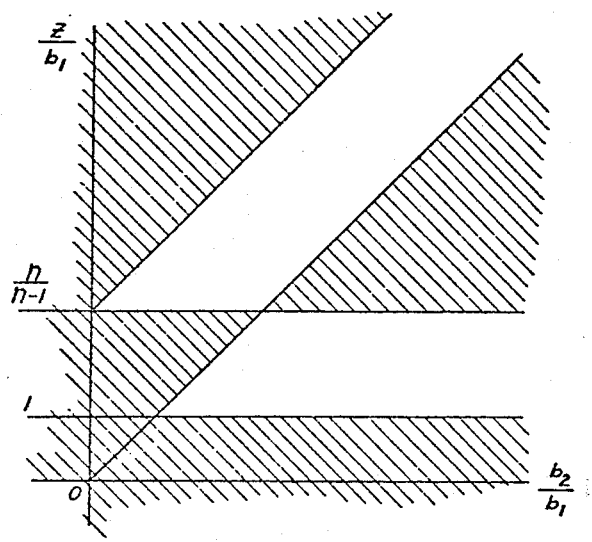
FIG. 4 is a stability diagram for the resonator of FIG. 1.

FIG. 4 is the resulting stability diagram obtained for the resonator shown in FIG. 1. In FIG. 4 the distance Z is the same as the distance $l$ of FIG. 3 due to the fact that the principal planes of sphere 15 coincide at its center. The crosshatched portions of the diagram are the unstable regions of the periodic sequence of lenses represented in FIG. 4, and indicate that a wave applied to a resonator having the indicated dimensions would be highly attenuated. That is, the resonator has high diffraction losses.

The stable operating region, or region of low diffraction losses, is defined by the two uncrosshatched portions of FIG. 4. Experience has shown, however, that operation within the region defined by $$1 < \frac{Z}{b_1} < \frac{n}{n-1} \quad (3)$$

is to be preferred. That is, Z is greater than $b_1$, but less than $b_1 n/n-1$.

In practice, there are some slight diffraction losses in the arrangement of FIG. 1 as a result of reflections from the surface of sphere 15. If, for any particular application, these losses become excessive, the region of the resonator between the mirrors can be filled with a transparent liquid whose index of refraction matches that of the sphere. Alternatively, the sphere can be coated with an anti-reflection coating using any of the well-known thin film coating techniques.

The curved mirror arrangement of FIG. 1 has the disadvantage that the input mirror, because of its curved shape, tends to defocus the incident light. A flat mirror, having parallel sides, on the other hand, would not have this defocusing effect and would, accordingly, be preferred.

Figure 5:
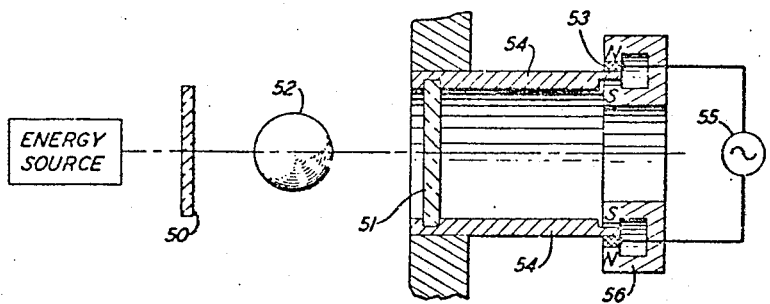
FIG. 5 is a second embodiment of the invention using parallel, planar mirrors and including means for vibrating one of the mirrors.

FIG. 5 shows an alternate embodiment of the invention using parallel, planar mirrors instead of the curved mirrors used in the embodiment of FIG. 1. As before, a sphere 52 is centrally located between the mirrors 50 and 51 with its center located along the axis of the resonator. And, as before, the incident light is applied to sphere 52 along this axis.

In all essential respects the embodiment of FIG. 5 is the same as the embodiment of FIG. 1. In fact, the embodiment of FIG. 5 can be considered a special case of the embodiment of FIG. 1. That is, mirrors 50 and 51 can be considered as curved mirrors of infinite radius. (i.e., $b_2 = \infty$). It is included here as a separate embodiment because parallel, planar mirrors heretofore have been considered difficult to adjust. However, due to the focusing effect of sphere 52, the planar mirrors, as viewed from within the sphere, behave as curved mirrors and, as such, their adjustment is in fact substantially less critical than might be expected. This can be readily seen to be so by considering the combination of sphere 52 and each of the mirrors as a thick mirror in the manner described on page 89 of Fundamentals of Optics by F. A. Jenkins and H. E. White, third edition, McGraw-Hill Book Company, Inc. So considered, the parallel, planar resonator of FIG. 5 can be shown to be the equivalent of a curved mirror resonator when viewed from within sphere 52, and to have the same adjustment characteristics of a curved mirror resonator.

To further reduce the difficulties associated with adjusting and maintaining the proper mirror spacing (resonator tuning), the distance between mirrors can be varied periodically in the manner described by Donald R. Herriott in an article entitled "Spherical-Mirror Oscillating Interferometer" published in the August 1963 issue of Applied Optics, pages 865 and 866. As described by Herriott, one of the mirrors 51 in FIG. 5 is mounted so that it is free to move only in an axial direction. A coil 53 wound on one end of the mirror structure 54 is positioned in the annular gap of a permanent magnet 56 so that a current in the coil 53 produces an axial force which moves the mirror 51 in the manner similar to a dynamic loudspeaker. Thus, a sinusoidal current applied to the coil 53 from a source 55 causes an axial oscillator of mirror 51 which sweeps the mirror through the proper tuning location at regular intervals. While this adds a modulation component to the resonator output, this expedient can nevertheless be used in those situations in which a pulsed output is preferred or can be tolerated.

The stability diagram for the planar mirror resonator shown in FIG. 5 is also given by FIG. 4. However, recognizing that $b_2$ is very large, the practical tuning region is given by $$b_1 < Z < \frac{b_1 n}{n-1}$$

Though described in connection with the embodiment of FIG. 5, it is understood that the technique of vibrating one of the resonator mirrors can also be applied to the embodiment of FIG. 1 as well.

It is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A tunable resonator comprising:
   a pair of curved, partially transparent mirrors of given radius of curvature whose centers of curvature lie along a common axis;
   a nonlinear birefringent crystal of spherical shape having a given radius disposed between said mirrors with its center along said axis;
   said crystal having at least one optical axis;
   means for rotating said sphere about its center for varying the angle between its optical axis and said common axis;
   means for applying an electromagnetic wave to said crystal through one of said mirrors;
   and means for adjusting the distance between said mirrors for tuning said resonator within its stable region of operation as defined by the ratio of the radius of curvature of said mirrors to the radius of said sphere.

2. The resonator according to claim 1 wherein said wave energy is applied to said crystal at a given frequency; and including means for extracting wave energy from said cavity at twice said frequency.

3. The resonator according to claim 1 wherein said wave energy is applied to said crystal at a signal frequency; means for applying pumping wave energy to said crystal in a direction parallel to said signal wave; and means for extracting amplified signal energy from said cavity.

4. The resonator as claimed in claim 1 wherein the said ratio is greater than unity but less than $n/n-1$.

5. The resonator as claimed in claim 1 wherein the direction of propagation of said wave is along said common axis.

6. The combination as claimed in claim 3 wherein the resonator is filled with a material having an index of refraction equal to that of said crystal.

7. The resonator according to claim 1 wherein the radius of curvature of said mirrors is infinite.

8. The resonator according to claim 1 including means for periodically varying the distance between said mirrors.

9. A tunable resonator comprising:
   a pair of planar, partially transparent mirrors;
   a sphere of nonlinear, birefringent material having a given radius centrally located between said mirrors;
   means for rotating said sphere about its center;
   means for applying an electromagnetic wave to said sphere through one of said mirrors;
   and means for adjusting the distance between said mirrors for tuning said resonator within its stable region of operation.

10. The resonator according to claim 9 wherein the distance between the mirrors and the center of said sphere lies between $b_1$ and $nb_1/n-1$, where $b_1$ is the radius of said sphere and $n$ is the index of refraction of said sphere.

11. The resonator according to claim 9 including means for periodically varying the distance between said mirrors.

No references cited.

ROY LAKE, *Primary Examiner.*